Oct. 20, 1931.   L. T. PARKER   1,827,855
REELING DEVICE
Filed March 15, 1928   2 Sheets-Sheet 1

INVENTOR
L. T. Parker
BY
ATTORNEY

Patented Oct. 20, 1931

1,827,855

UNITED STATES PATENT OFFICE

LEE T. PARKER, OF WEST ORANGE, NEW JERSEY, ASSIGNOR TO AMERICAN TELEPHONE AND TELEGRAPH COMPANY, A CORPORATION OF NEW YORK

REELING DEVICE

Application filed March 15, 1928. Serial No. 261,807.

This invention relates to reeling devices, and, more particularly, to power reeling devices of the collapsible type.

An object of the invention consists in the provision of a reel which is adapted to be attached to or removed from a power shaft in a simple and expeditious manner.

Another object consists in providing such reel with collapsible mechanism by which a coil of wire, or like material, may be bodily removed or placed in position on said reel.

A further object consists in the provision of a reel of a compact and rugged structure, which is reliable and comparatively inexpensive to manufacture.

These and further objects will be apparent from the following description, when considered in connection with the accompanying drawings, in which one modification of the invention is illustrated.

Figure 1:
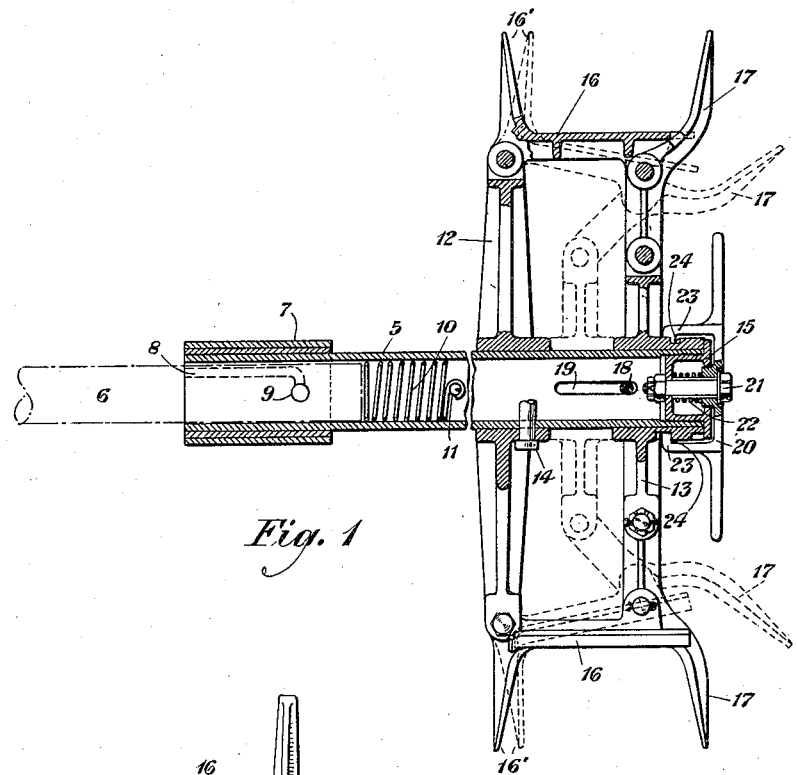
Figure 2:
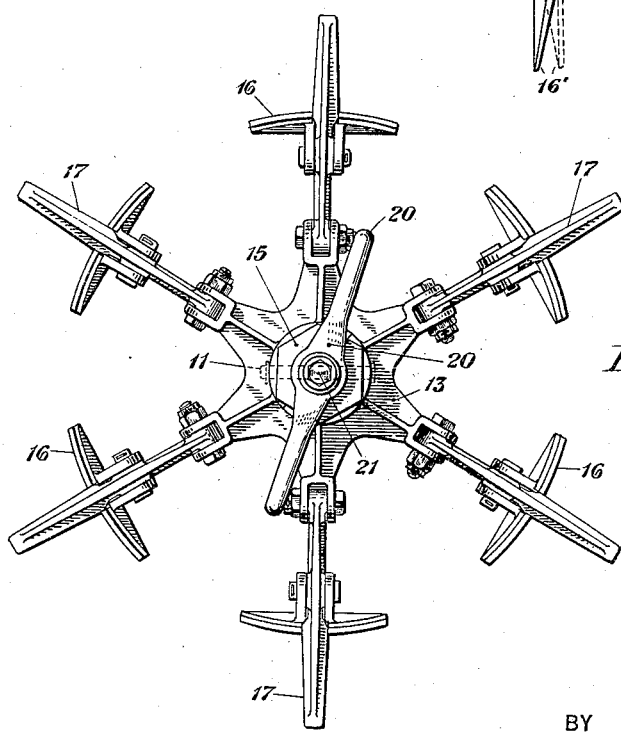
Figure 3:
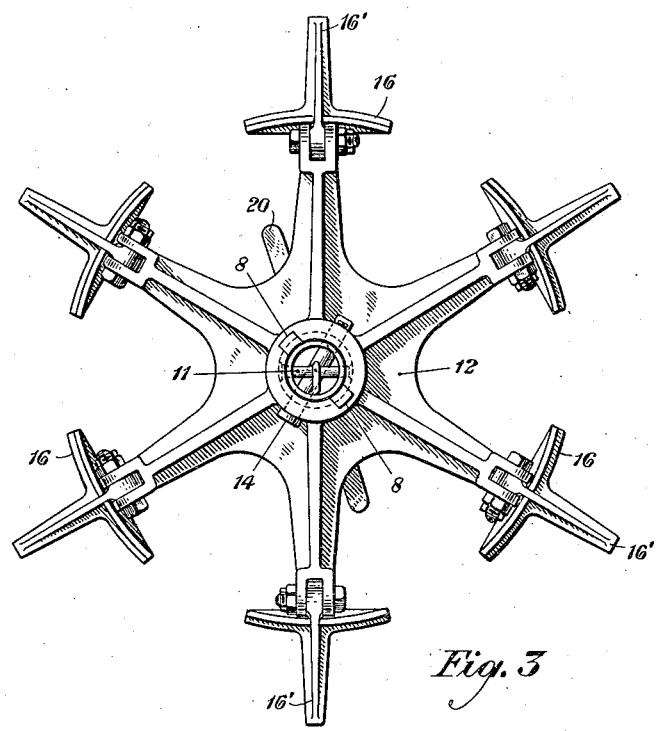
Figure 4:
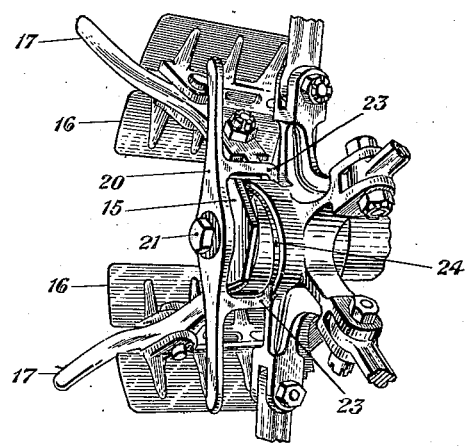

Referring to the drawings, Figure 1 is a crosssection of the improved reel as applied to the end of a winch shaft, showing the collapsed position of the device in dotted lines, and its operating position in full lines; Fig. 2 is an end elevation looking from the right of Fig, 1; Fig. 3 is an end elevation looking from the left of Fig. 1, and Fig. 4 is an enlarged detail in perspective, showing the locking mechanism of the sliding spider of the reel.

The reel consists of a central shaft or spindle 5 which may be composed of seamless steel tubing, and is shown as applied to the end of a power shaft 6. The diameter of the left end of the reel shaft 5 is enlarged by the provision of outer concentric sections 7 of seamless tubing. These sections may be welded or otherwise affixed to the end of the shaft 5. This form of reenforcement may be made to the ends of the shaft 5 in order to provide two longitudinal slots 8 which are diametrically opposed to each other. The slots serve to engage the ends of a fixed pin 9 which extends through the shaft. The slots 8 have a right angle bend at one end, and are also provided with a cutaway portion to form a seat for the pin 9. A spring 10 is under compression and forces the power shaft pin 9 into the cutaway portion. One end of the spring 10 is secured by a pin 11 which extends through the reel shaft 5.

The reel is mounted on the outer end of the shaft 5 and is provided with an inner or fixed spider 12 and an outer or sliding spider 13. The spiders are each provided with a plurality of coinciding and circumferentially spaced arms which radiate from a central hub, and are interconnected by a web extending radially from the hub. The arms of the inner spider 12 are of greater length than the arms of its companion member 13, and the extremities of the arms of each member are bifurcated, as will be presently referred to. The inner spider 12 is affixed to the reel shaft 5 by the pin 14. The outer spider 13 is movable longitudinally on the end of the shaft, its range of movement being between the end of the hub of spider 12 and the stop plate 15. This stop plate 15 may be in the form of a nut which is provided with an extended casing screwed into the end of the reel shaft. The spider 13 is prevented from rotating on the shaft 5 by means of a pin 18 which extends through its hub. This pin 18 slides in a slot 19, positioned longitudinally on the shaft, in accordance with the movement of the spider 13.

Plates or wire supports 16 substantially in the form of arcuate segments are spaced circumferentially in accordance with each pair of coinciding arms of the spiders 12 and 13. These plates or supports are provided at each end with perforated flanges, and one end also carries an inner reel arm 16'. One of the flanges of said plates or supports is pivotally connected with the bifurcated end of its associated arm of the spider 12. The other flange of the plate or support is pivotally connected with the approximate midpoint of an outer reel arm 17, while one of the extremities of these latter members is pivotally connected with the bifurcated end of the outer or movable spider 13. The reel arms 16' and 17 extend upwardly from the supports 16 and serve to confine the wire as it is wound between them on said supports. The pivotal or link connection of the movable spider 13 and reel arms 17, and the connection between the reel arms 17 and the wire supports 16 are in a line perpendicular to the axis of the reel shaft 5. This arrangement forms a toggle which, when collapsed or broken, assumes the position shown by dotted lines in Fig. 1. This collapse permits the coil of wire or rope which may be wound on the reel to be bodily and readily removed.

The reel is, in the present instance, shown as having spiders provided with six arms extending radially from a central hub or shaft. These arms cooperate with each other to form a wire support whose arcuate segments or bases form a sectional rim. The segments are curved on a radius equal to the curvature of the coil, and so proportioned to provide sufficient bearing surface so that a coil of practically circular nature may be formed thereon.

A control member in the form of a handle 20 is positioned on the outer end of the shaft 5. This handle which provides locking means, as will be presently described, is rotatably mounted on a bolt 21. The bolt is secured to a casing threaded into the end of the shaft 5, and the stop plate 15 forms an outer cover for such casing. A spiral spring 22 is positioned on the bolt 21 within the casing and provides compression to frictionally engage the end of the handle, which extends through the plate 15 into the casing, to prevent said handle from turning under vibration. The handle 20 is provided with projecting extensions which terminate in fingers 23, which are oppositely positioned with respect to each other. The fingers 23 have ends which are inwardly turned toward each other and engage helical grooves 24, 24, as more clearly indicated in Fig. 4. The two helical grooves 24, 24 extend only half the distance about, and are positioned approximately 180° apart with respect to each other on the hub. The grooves are open at the end of the hub to permit a greater longitudinal movement of the movable spider than the incline of the grooves would otherwise permit.

When the reel is in an operating or extended position, a left hand or counter-clockwise rotation of the handle 20 causes its fingers 23, 23 to bear against the respective inner sides of the grooves 24, 24. This action forces the sliding spider inwardly on the reel shaft, and breaks the previously mentioned toggle. This movement of the handle 20 causes the movable spider 13 to travel about half its range of movement. The remainder of travel of the spider is caused by the weight of the wire on the reel, or by a slight pressure by the operator on the movable spider to cause its extreme collapse.

In extending the reel from its collapsed position, the operator pulls the movable spider outwardly until the two fingers 23, 23 of the handle 20 enter the grooves 24, 24. A clockwise or right handed rotation of the handle 20 draws the movable spider 13 to its extreme outward position so that the above mentioned toggle is reestablished. When the reel is in its operating position, the ends of the fingers 23, 23 rest against the outer side of the grooves 24, 24. In this position, they lie parallel to the end of the hub, so that any stress set up by the wire in the reel will not cause the sliding spider to move inwardly and rotate the control handle 20.

The reel is placed in position for operating by sliding its hollow shaft 5 over the end of the power shaft 6 so that the ends of the fixed pin of the power shaft enter two opposite grooves 8, 8 of the reel shaft. The reel is thrust on the power shaft as far as possible, thus placing compression in the spring 10. The shaft is then turned in a left or counter-clockwise direction so that the ends of the fixed pin in the power shaft engage the cut-away portions of the angular grooves located at the end of the grooves 8, 8. With the reel mounted on the power shaft and in an operating position, as shown in Fig. 1, an end of the rope, wire or other material to be coiled on the reel is tied to one arm of the fixed spider. Power is then applied through the shaft, to the reel shaft connected to the fixed spider 12, through the driving pin 14 which secures the fixed spider to the reel shaft. The reel is turned in this instance in a clockwise direction. When the reel has become filled with wire or rope or the like, it is stopped, and if it is desired several tie wires may be lashed about the coil to keep it in shape, and the end detached from the arm of the fixed spider. The control handle is then rotated in a counter-clockwise direction, which breaks the toggle and permits the reel to collapse to the position shown by dotted lines in Fig. 1. The coil may be then removed, and the reel extended to its normal or operating position, as previously described.

What is claimed is:

1. A reel comprising a hub having a fixed spider and a movable spider, each spider having parallel arms extending from said hub, a shaft to which one of said spiders is fixed, the other hub being slidable upon said shaft, a sectional rim between the arms of the spiders to form a support to wind a coil of wire, an extension from the ends of each sectional rim to confine said coil therebetween, means for associating the sectional rim with the arms of the spiders in toggle connection, and locking means coaxially mounted with respect to the shaft and engaging the movable hub, said locking means being rotatable independently of the shaft to slide the movable hub along the shaft to collapse said rim and said extensions to permit the release of the coil of wire formed on said rim between said extensions.

2. A reel comprising a fixed spider and a movable spider, each having parallel arms extending from a central hub, a shaft to which one of said hubs is fixed, the other hub being slidable upon said shaft, sectional rim members, each having one end pivoted to an arm of the spider with the fixed hub, each rim member having a fixed projecting arm extending at an angle thereto and forming a retaining member at one side of the reel, a single toggle link extending from each arm of the spider with the movable hub and directly pivoted to the opposite end of the corresponding rim member, and arms associated with said last-mentioned ends of said rim members to form retaining members for the corresponding side of the reel.

3. A reel comprising a fixed spider and a movable spider, each having parallel arms extending from a central hub, a shaft to which one of said hubs is fixed, the other hub being slidable upon said shaft, sectional rim members, each having one end pivoted to an arm of the spider with the fixed hub, each rim member having a fixed projecting arm extending at an angle thereto and forming a retaining member at one side of the reel, a single toggle link extending from each arm of the spider with the movable hub and directly pivoted to the opposite end of the corresponding rim member, and extension arms integral with said toggle links and extending beyond the pivotal points of said rim members to form retaining members for the corresponding side of the reel.

In testimony whereof, I have signed my name to this specification this 14th day of March 1928.

LEE T. PARKER.